(12) United States Patent
Taguchi et al.

(10) Patent No.: US 11,643,300 B2
(45) Date of Patent: May 9, 2023

(54) MOVEMENT-DISTANCE MEASUREMENT APPARATUS CAPABLE OF REDUCING ERROR DUE TO CHANGE IN ANGLE OF MAXIMUM REFLECTION INTENSITY ACCORDING TO MOVEMENT AND REDUCING ERROR DUE TO MISALIGNMENT OF ANTENNA

(71) Applicant: Mitsubishi Electric Corporation, Tokyo (JP)

(72) Inventors: Hiroshi Taguchi, Chiyoda-ku (JP); Kota Sadamoto, Chiyoda-ku (JP); Wataru Tsujita, Chiyoda-ku (JP); Yoshitsugu Sawa, Chiyoda-ku (JP); Masahiro Ishikawa, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 645 days.

(21) Appl. No.: 16/485,451

(22) PCT Filed: Jan. 12, 2018

(86) PCT No.: PCT/JP2018/000656
§ 371 (c)(1),
(2) Date: Aug. 13, 2019

(87) PCT Pub. No.: WO2018/198441
PCT Pub. Date: Nov. 1, 2018

(65) Prior Publication Data
US 2020/0071124 A1    Mar. 5, 2020

(30) Foreign Application Priority Data
Apr. 26, 2017 (JP) .............................. JP2017-087523

(51) Int. Cl.
*G01S 13/62* (2006.01)
*B66B 1/34* (2006.01)
(Continued)

(52) U.S. Cl.
CPC .............. *B66B 3/02* (2013.01); *B66B 1/3492* (2013.01); *B66B 3/023* (2013.01); *G01S 13/38* (2013.01);
(Continued)

(58) Field of Classification Search
CPC ......... B66B 3/02; B66B 3/023; B66B 1/3492; G01S 13/38; G01S 13/62; G01S 13/88; G01S 13/60; G01S 7/40; G01C 3/10
See application file for complete search history.

(56) References Cited

U.S. PATENT DOCUMENTS 5,534,871 A    7/1996  Hidaka et al.
2009/0027267 A1*  1/2009  Carter ................ H01Q 15/0066
                                                342/372
(Continued)

FOREIGN PATENT DOCUMENTS

JP       58-205876 A     11/1983
JP       1-92680 A       4/1989
(Continued)

OTHER PUBLICATIONS

Office Action dated Dec. 9, 2020 in Korean Patent Application No. 10-2019-7030721, 11 pages.
(Continued)

Primary Examiner — Donald H B Braswell
(74) Attorney, Agent, or Firm — Xsensus LLP

(57) ABSTRACT

A movement-distance measuring apparatus is provided with: an antenna, a phase detection circuit, a phase-shift calculation circuit, and a movement-distance calculation circuit. The antenna transmits a radio wave toward a plurality of
(Continued)

reflectors arranged at constant intervals along a moving path of a moving object, and receives a reflected wave from the reflectors. The phase detection circuit detects a phase of the reflected wave received by the antenna. The phase-shift calculation circuit calculates a phase shift based on the phase detected by the phase detection circuit. The movement-distance calculation circuit calculates a movement distance of the moving object, based on the phase shift calculated by the phase-shift calculation circuit, and based on the interval of the reflectors.

7 Claims, 10 Drawing Sheets

(51) Int. Cl.
    *G01S 13/88*         (2006.01)
    *B61L 25/02*         (2006.01)
    *B66B 3/02*          (2006.01)
    *G01S 13/38*         (2006.01)

(52) U.S. Cl.
    CPC .............. *G01S 13/62* (2013.01); *B61L 25/021* (2013.01); *G01S 13/88* (2013.01)

(56) References Cited

U.S. PATENT DOCUMENTS

| | | | |
|---|---|---|---|
| 2011/0205130 A1* | 8/2011 | Mrstik | H01Q 21/0018 |
| | | | 343/703 |
| 2012/0136621 A1 | 5/2012 | Inomata et al. | |
| 2014/0036265 A1* | 2/2014 | Tsujita | G01D 5/345 |
| | | | 356/364 |
| 2014/0225765 A1* | 8/2014 | Inomata | G01C 21/166 |
| | | | 342/127 |
| 2016/0103197 A1* | 4/2016 | Schultz | G01R 27/32 |
| | | | 324/601 |

FOREIGN PATENT DOCUMENTS

| | | |
|---|---|---|
| JP | 2003-52105 A | 2/2003 |
| JP | 2012-112794 A | 6/2012 |
| WO | 2012/143988 A1 | 10/2012 |
| WO | 2013/105359 A1 | 7/2013 |
| WO | 2016/136371 A1 | 9/2016 |

OTHER PUBLICATIONS

International Search Report and Written Opinion dated Apr. 10, 2018 for PCT/JP2018/000656 filed on Jan. 12, 2018, 7 pages including English Translation of the International Search Report.
Chinese Office Action dated Oct. 26, 2022 in corresponding Chinese Patent Application No. 201880025246.0 (with English translation), 16 pages.

* cited by examiner

Fig. 8

|  |  | DISTANCE FROM ANTENNA 12 TO REFLECTIVE BODY 8 | | | | |
|---|---|---|---|---|---|---|
|  |  | ... | 199 mm | 200 mm | 201 mm | ... |
| PHASE OF REFLECTED WAVE | 0 | ... | -0.134 | 0.045 | 0.172 | ... |
|  | ⋮ |  | ⋮ | ⋮ | ⋮ |  |
|  | $0.5\pi$ | ... | 0.112 | 0.169 | 0.030 | ... |
|  | ⋮ |  | ⋮ | ⋮ | ⋮ |  |
|  | $\pi$ | ... | 0.134 | -0.045 | -0.172 | ... |
|  | ⋮ |  | ⋮ | ⋮ | ⋮ |  |

MOVEMENT-DISTANCE MEASUREMENT APPARATUS CAPABLE OF REDUCING ERROR DUE TO CHANGE IN ANGLE OF MAXIMUM REFLECTION INTENSITY ACCORDING TO MOVEMENT AND REDUCING ERROR DUE TO MISALIGNMENT OF ANTENNA

CROSS-REFERENCE TO RELATED APPLICATIONS

The present application is based on PCT filing PCT/JP2018/000656, filed Jan. 12, 2018, which claims priority to JP 2017-087523, filed Apr. 26, 2017, the entire contents of each are incorporated herein by reference.

TECHNICAL FIELD

The present invention relates to a movement-distance measuring apparatus and a movement-distance measuring method for measuring a movement distance of a moving object. The present invention further relates to an elevator and a vehicle provided with the movement-distance measuring apparatus.

BACKGROUND ART

For example, Patent Document 1 discloses a travel distance measurement device that is mounted to a moving object, such as an elevator cab or a vehicle, and measures a movement distance (travel distance) and/or a speed of the moving object, using a radio wave.

Patent Document 1 discloses transmitting a radio wave from a moving object (vehicle) to a fixed surface (ground), calculating a phase shift of a reflected wave with respect to a transmitted wave using quadrature detection, and calculating a travel distance based on the phase shift. Since the travel distance is calculated based on a phase shift without using information on an amplitude of the reflected wave, it is possible to accurately measure the travel distance, even when conditions of reflection of the radio wave on the fixed surface rapidly change.

CITATION LIST

Patent Documents

PATENT DOCUMENT 1: PCT International Publication WO 2013/105359 A1

SUMMARY OF INVENTION

Technical Problem

According to Patent Document 1, the radio wave is transmitted to the ground including ballast and railroad ties, that is, to a fixed surface with random projections and recesses, and the travel distance is calculated based on the phase shift of the reflected wave, and an angle of maximum reflection intensity. However, if the fixed surface is not uniformly flat, the angle of maximum reflection intensity varies according to movement, which causes a problem of an error in the calculated result of the travel distance. In addition, the angle of maximum reflection intensity is calculated based on a distance from an antenna to the fixed surface, which also causes a problem of an error due to misalignment of the antenna mounted.

An object of the present invention is to solve the above-mentioned problems, and to provide a movement-distance measuring apparatus and a movement-distance measuring method capable of accurately measuring a movement distance of a moving object as compared to the prior art. Further, another object of the present invention is to provide an elevator and a vehicle provided with such a movement-distance measuring apparatus.

Solution to Problem

According to an aspect of the present invention, a movement-distance measuring apparatus is provided with: a transmitting and receiving antenna, a phase detection circuit, a phase-shift calculation circuit, and a movement-distance calculation circuit. The transmitting and receiving antenna transmits a radio wave toward reflective body including a plurality of reflectors arranged at constant intervals along a moving path of a moving object, and receives a reflected wave from the reflective body. The phase detection circuit detects a phase of the reflected wave received by the transmitting and receiving antenna. The phase-shift calculation circuit calculates a phase shift based on the phase detected by the phase detection circuit. The movement-distance calculation circuit calculates a movement distance of the moving object, based on the phase shift calculated by the phase-shift calculation circuit, and based on the interval of the reflectors.

Advantageous Effects of Invention

According to the movement-distance measuring apparatus of the present invention, since the movement distance is calculated based on intervals of the reflective body, it is possible to more accurately measure the movement distance of the moving object as compared to the prior art, by reducing an error due to a change in angle of maximum reflection intensity according to movement, and reducing an error due to misalignment of the antenna mounted.

BRIEF DESCRIPTION OF DRAWINGS

FIG. 8 is a view showing an example of a correction table used by the movement-distance measuring apparatus 10B according to the third embodiment of the present invention.

DESCRIPTION OF EMBODIMENTS

First Embodiment

A first embodiment illustrates a case where a movement-distance measuring apparatus is mounted to an elevator cab. In this case, the elevator cab is a moving object, and the movement-distance measuring apparatus measures a movement distance of the cab moving along a hoistway.

Figure 1:
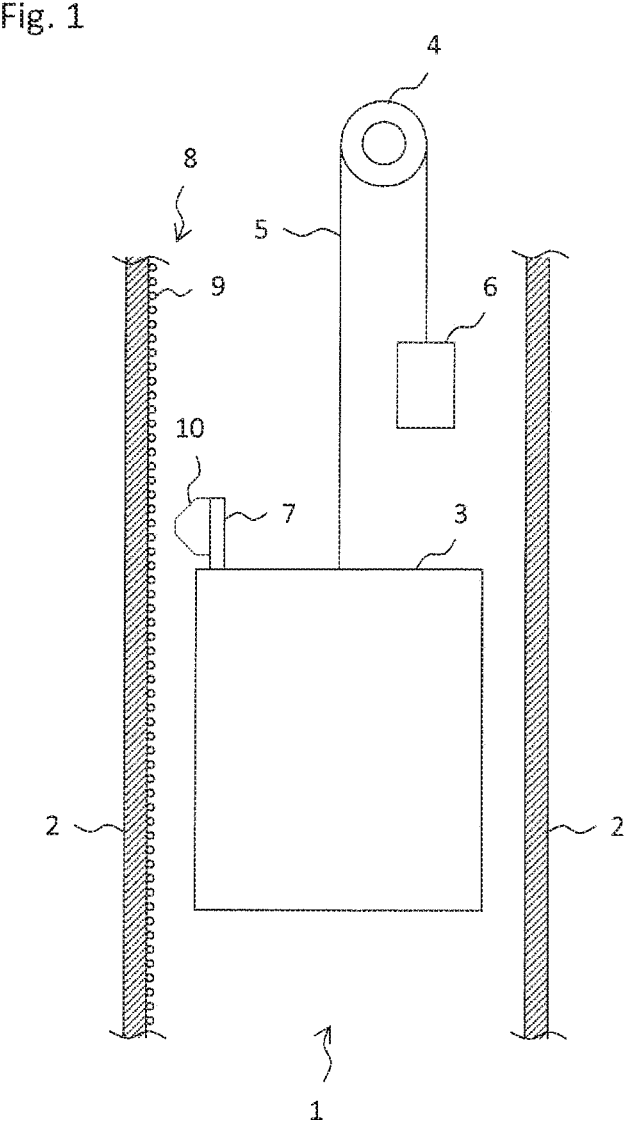
FIG. 1 is a view showing a configuration of an elevator to which a movement-distance measuring apparatus 10 according to a first embodiment of the present invention is mounted.

FIG. 1 is a view schematically showing a configuration of an elevator to which a movement-distance measuring apparatus 10 according to the first embodiment of the present invention is mounted. Referring to FIG. 1, a pair of guide rails 2 is installed in a hoistway 1. A cab 3 is guided by the guide rails 2, and ascends and descends in the hoistway 1. The cab 3 is suspended by a main rope 5 wound on a drive apparatus 4, and a counterweight 6 is suspended by the main rope 5 on the opposite side of the cab 3. On the top of the cab 3, the movement-distance measuring apparatus 10 is mounted via a support jig 7. Meanwhile, the movement-distance measuring apparatus 10 may be mounted to the side or bottom of the cab 3.

A reflective body 8 is mounted to the guide rail 2. The reflective body 8 is reflective means including a plurality of reflectors 9 arranged at constant intervals. The reflectors 9 are radio wave reflection members, made of metal or ceramic, etc., and have the same shape with each other. The shape of the reflectors 9 is columnar or spherical. In order to improve reflection characteristics in an incident direction of a radio wave, a reflective surface needs to be a rough surface, rather than a smooth surface, for the transmitted wave, that is, a surface with projections and recesses. The Rayleigh criterion is known as a measure thereof. According to the Rayleigh criterion, the reflective surface can be treated as a rough surface, as long as a path difference of the radio wave from a transmitting antenna 12a to a receiving antenna 12b, between whether a radio wave is reflected by a recess or by projection of the reflective surface, is a quarter wavelength or more of a transmitted wave. Based on such a criterion, a height of the reflectors 9 is determined such that the reflective surface is a rough surface. How to determine the interval of the reflectors 9 will be described in detail below. Meanwhile, it suffices that the reflective body 8 is installed along a moving path of the cab 3 so as to be substantially parallel to the moving direction of the cab 3. The reflective body 8 may be mounted, for example, to a structure other than the guide rail 2, or to a wall of the hoistway, may be installed separately to the structure and the wall, and may be integrally formed with the guide rail 2.

Figure 2:
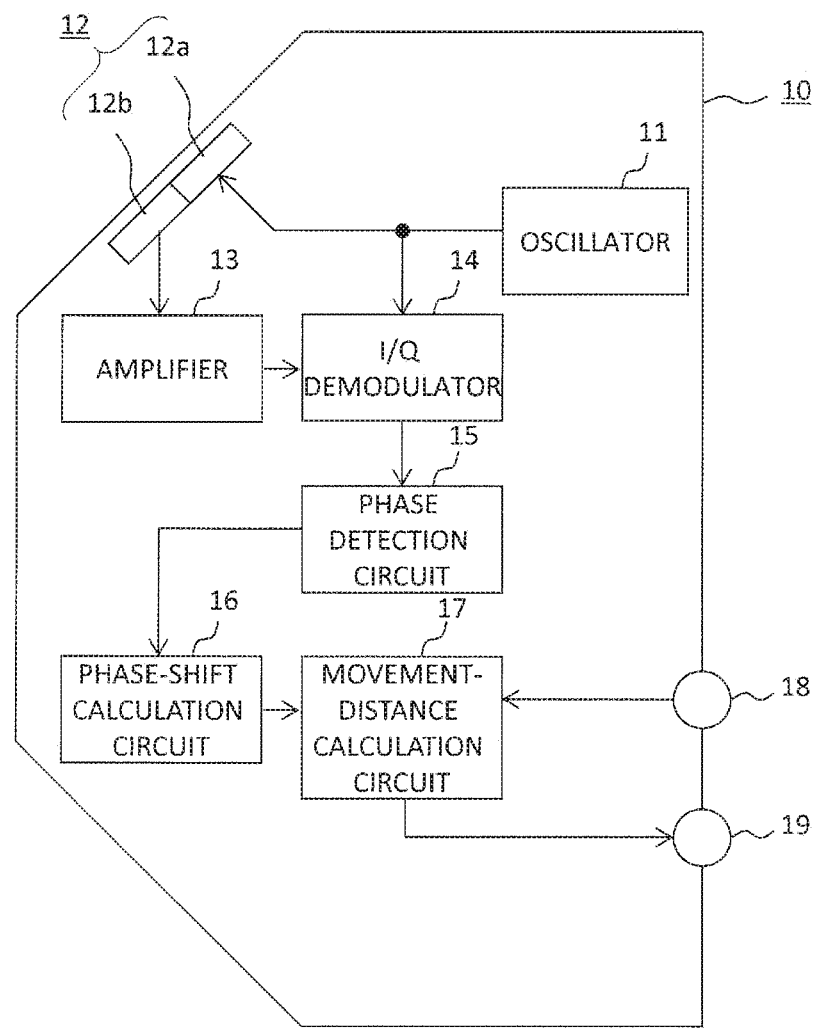
FIG. 2 is a diagram showing an internal configuration of the movement-distance measuring apparatus 10 according to the first embodiment of the present invention.

FIG. 2 is a diagram showing an internal configuration of the movement-distance measuring apparatus 10 according to the first embodiment of the present invention. The movement-distance measuring apparatus 10 measures a movement distance of the cab 3. Referring to FIG. 2, the movement-distance measuring apparatus 10 is provided with an oscillator 11, an antenna 12, an amplifier 13, an I/Q demodulator 14, a phase detection circuit 15, a phase-shift calculation circuit 16, a movement-distance calculation circuit 17, an input terminal 18, and an output terminal 19.

The oscillator 11 generates a radio frequency signal. The oscillator 11 generates the radio frequency signal in a stable manner by synchronizing a phase locked loop (PLL) with a reference signal source having good temperature characteristics, such as a crystal oscillator. The oscillator 11 generates a radio frequency signal having a preset radio frequency. The radio frequency signal generated by the oscillator 11 is passed to the transmitting antenna 12a and the I/Q demodulator 14, as a transmitting signal. In order to measure a movement distance, the oscillator 11 may generate a radio frequency signal of a microwave band, such as 10 GHz band, 24 GHz band, 60 GHz band, or 77 GHz band, etc.

The antenna 12 is transmitting and receiving means configured as a patch antenna, in which the transmitting antenna 12a and the receiving antenna 12b are formed on a same substrate. The transmitting antenna 12a emits the transmitting signal generated by the oscillator 11, toward the reflective body 8, as a radio wave (transmitted wave). The receiving antenna 12b receives the radio wave (reflected wave) emitted from the transmitting antenna 12a and reflected by the reflective body 8, and obtains the radio wave as a reflected signal corresponding to the transmitting signal. The reflected signal obtained by the receiving antenna 12b is passed to the amplifier 13. Meanwhile, the transmitting antenna 12a and the receiving antenna 12b may be configured as separate components arranged close to each other. In addition, the transmitting antenna 12a and the receiving antenna 12b may be provided at separate positions of the movement-distance measuring apparatus 10. In this case, a propagation distance of a radio wave from the transmitting antenna 12a to the reflective body 8 may be different from a propagation distance of a radio wave from the reflective body 8 to the receiving antenna 12b. Hereinafter, in the present specification, we describe an exemplary case where the propagation distance of a radio wave from the transmitting antenna 12a to the reflective body 8 is equal to the propagation distance of a radio wave from the reflective body 8 to the receiving antenna 12b.

It is assumed that a polarization direction of the transmitting antenna 12a and the receiving antenna 12b is horizontal. That is, the polarization direction is parallel to a width direction of the guide rail 2, and orthogonal to a longitudinal direction of the guide rail 2. Meanwhile, the polarization direction of the transmitting antenna 12a and the receiving antenna 12b may be vertical.

The amplifier 13 amplifies the reflected signal passed from the receiving antenna 12b, to a certain amplitude level. The reflected signal amplified by the amplifier 13 is passed to the I/Q demodulator 14.

The I/Q demodulator 14 demodulates the reflected signal passed from the amplifier 13 and corresponding to the transmitting signal, using quadrature detection (I/Q detection) based on the transmitting signal generated by the oscillator 11 as a reference signal, to obtain I/Q signals indicating coordinates of the reflection signal on an I/Q plane. The I/Q signals obtained by the I/Q demodulator 14 are passed to the phase detection circuit 15.

The phase detection circuit 15 is phase detection means to detect a phase of the reflected wave based on the I/Q signals obtained by the I/Q demodulator 14. A signal indicating the phase detected by the phase detection circuit 15 is passed to the phase-shift calculation circuit 16.

The phase-shift calculation circuit 16 is phase-shift calculation means to calculate a phase shift based on the phase detected by the phase detection circuit 15. A signal indicating the phase shift calculated by the phase-shift calculation circuit 16 is passed to the movement-distance calculation circuit 17.

The movement-distance calculation circuit 17 is movement-distance calculation means to calculate a movement distance of the cab 3, based on the phase shift calculated by the phase-shift calculation circuit 16, and based on the interval of the reflectors 9 of the reflective body 8. A signal indicating the movement-distance calculated by the movement-distance calculation circuit 17 is passed to the output terminal 19. Note that, when an external reset signal is inputted via the input terminal 18, the movement-distance calculation circuit 17 resets the movement distance to zero.

Hereinafter, we describe how to calculate the movement distance of the cab 3 based on the phase shift of the reflected wave, and also describe problems thereof.

Figure 3:
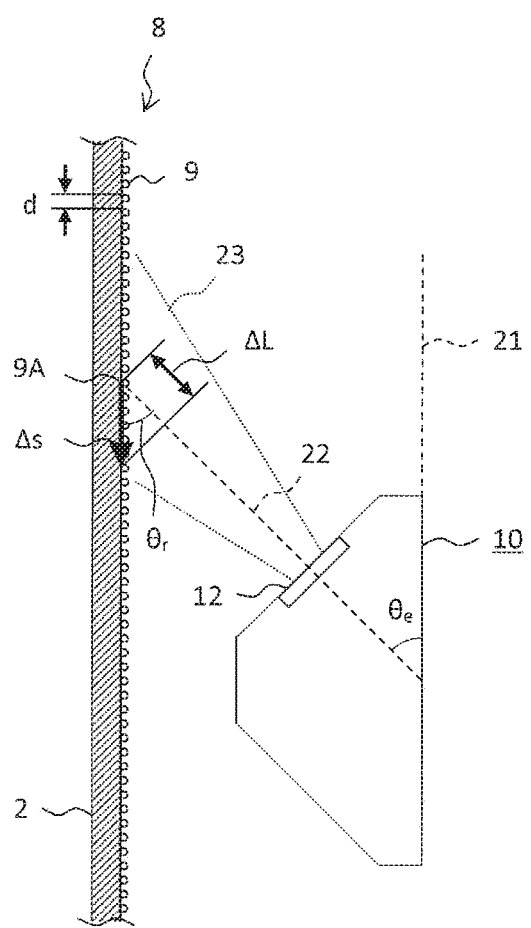
FIG. 3 is a view for explaining a phase shift of a reflected wave due to movement of a cab 3 of the first embodiment of the present invention.

FIG. 3 is a view for explaining a phase shift of a reflected wave due to movement of the cab 3 of the first embodiment of the present invention. Referring to FIG. 3, a dashed line 21 is a line parallel to a surface of the guide rail 2. A dashed line 22 is a line at an angle $\theta_e$ with respect to the dashed line 21, that is, a line inclined with respect to an upward direction in which the cab 3 moves. The angle $\theta_e$ is, for example, 45 degrees. As shown in FIG. 3, the antenna 12 is arranged such that a direction of a beam of the transmitted wave is aligned with the dashed line 22. The transmitted wave is emitted from the transmitting antenna 12a with a certain beam width. A reflected wave received by the receiving antenna 12b is a composite wave of the reflected waves from the various reflectors 9 included in an exposed area 23. In this case, the exposed area 23 is an area of a half-value angle (half-value width) of the transmitting antenna 12a. Within the exposed area 23, the reflection is maximized at a point where the dashed line 22 intersects the surface of the guide rail 2, or at a slightly nearer region than that point (a region nearer to the movement-distance measuring apparatus 10). This is because the nearer to the movement-distance measuring apparatus 10, the shorter the distance to the antenna 12.

Referring to FIG. 3, among the plurality of reflectors 9, a reflector 9 at the point where the dashed line 22 intersects the surface of the guide rail 2 is shown as "reflector 9A". A vector Δs indicates a direction and magnitude in which the reflector 9A apparently moves per small unit time. In fact, the movement-distance measuring apparatus 10 moves according to movement of the cab 3, but in this case, the movement-distance measuring apparatus 10 is assumed to be a fixed reference point. In addition, the small unit time is set to a time length during which the cab 3 moves at a maximum speed by a distance sufficiently smaller than a wavelength of the transmitted wave (e.g., ⅒ or less thereof). An angle $\theta_r$ indicates an angle of maximum reflection intensity. A movement distance of the cab 3 is calculated based on a reflected wave incoming from the direction of the angle $\theta_r$. In this case, we describe a case where the angle $\theta_r$ is the same with the angle $\theta_e$, but the angle $\theta_r$ and the angle $\theta_e$ are not necessarily the same with each other.

Now, a change ΔL of the distance from the antenna 12 to the reflector 9A is given by the following mathematical expression (1).

$$\Delta L = \Delta s \cdot \cos \theta_r \quad (1)$$

In addition, when "λ" denotes a wavelength of the transmitted wave, a phase shift Δφ of the reflected signal for the small unit time is given by the following mathematical expression (2).

$$\Delta\varphi = 2(2\pi/\lambda) \cdot \Delta L \quad (2)$$

This phase shift Δφ appears as a change in output signals of the I/Q demodulator 14. The I/Q demodulator 14 demodulates the reflected signal using quadrature detection based on the transmitting signal, to output the I/Q signals including two components, an in-phase component (I component) and a quadrature component (Q component). Then, the phase detection circuit 15 can calculate arctan(Q/I) to obtain a phase of the I/Q signals, where "arctan" indicates an arctangent function. Then, the phase-shift calculation circuit 16 can calculate a difference between a current phase, and a phase preceding by the small unit time, to obtain the phase shift Δφ. Then, the movement-distance calculation circuit 17 can calculate the movement distance Δs per small unit time based on the phase shift Δφ using the mathematical expressions (1) and (2), and integrate the movement distance Δs for an integration time, to determine a distance by which the cab 3 has moved for the integration time (integrated movement distance).

In the above explanation, we have described how to calculate an integrated movement distance "s" of the cab 3, by calculating the movement distance Δs per small unit time and integrating it. On the other hand, the phase shift Δφ per small unit time may be integrated to obtain an integrated phase shift "φ", and then, it is possible to directly obtain the integrated movement distance "s" from the integrated phase shift "φ". The mathematical expressions (1) and (2) are reduced by substituting the integrated movement distance "s" for the movement distance Δs per small unit time, and substituting the integrated phase shift "φ" for the phase shift Δφ per small unit time, and then, the following mathematical expression (3) is obtained.

$$s = \varphi \cdot \lambda / (4\pi \cdot \cos \theta_r) \quad (3)$$

In this case, the phase is calculated such that when the phase has changed from 0 to 2π, the phase further changes from 2π to 4π, instead of returning from 2π to 0 and again changing to 2π. Such continuous accumulation without discontinuities in phase, known as "phase unwrapping", is used in this case. That is, the phase shift is integrated over 2π or more, and the integrated movement distance is calculated from the integrated phase shift.

Note that, when an external reset signal is inputted via the input terminal 18, the movement-distance calculation circuit 17 resets the integrated phase shift to zero.

When determining the movement distance of the cab 3 as described above, there is a problem that if the angle $\theta_r$ deviates or is not known accurately, it is not possible to accurately calculate the phase shift and the integrated phase shift, and an error occurs in the calculated result of the movement distance.

As described above, in order to improve reflection characteristics in an incident direction of a radio wave, a reflective surface needs to be a rough surface, rather than a smooth surface, for the transmitted wave, that is, a surface with projections and recesses. The surface with projections and recesses includes regions with high reflection intensity, and regions with low reflection intensity. In addition, since the radio wave is emitted from the transmitting antenna 12a with a certain beam width, a reflected wave received by the receiving antenna 12b is a composite wave of reflected waves from various points included in an exposed area.

Therefore, in accordance with a positional relationship of the transmitting antenna 12a and the receiving antenna 12b and the reflective surface, an angle of maximum reflection intensity of the reflected wave received by the receiving antenna 12b varies. Thus, the angle of maximum reflection intensity varies according to movement of the cab 3, and therefore, unless sequentially detecting the angle for use, an error occurs in the calculated result of the movement distance. It is difficult to sequentially and accurately detect the angle of maximum reflection intensity.

In order to solve this problem, the movement-distance measuring apparatus 10 according to the first embodiment is provided with the movement-distance calculation circuit 17 that calculates a movement distance of the cab 3, based on a phase shift of a reflected wave from the reflective body 8 including the plurality of reflectors 9 arranged at constant intervals, and based on the interval of the reflectors 9. According to this configuration, it is possible to more accurately measure the movement distance of the cab 3 as compared to the prior art, by reducing an error due to a change in angle of maximum reflection intensity according to movement, and reducing an error due to misalignment of the antenna mounted.

Next, we describe how to determine the interval of the reflectors 9 of the reflective body 8.

Referring to FIG. 3, the reflectors 9 are arranged at constant intervals "d". In a case where the reflectors 9 are arranged at equal intervals, when the cab 3 starts moving from a certain position, and has moved a distance of the interval "d", a positional relationship between the antenna 12 and the reflectors 9 is the same with their positional relationship before the movement, except being shifted by a distance of one reflector. Thus, the phase of the reflected wave received by the receiving antenna 12b is also the same with the phase before the movement. At this time, the phase rotates one cycle, and shifts by $2\pi$.

According to the mathematical expression (2), while the change $\Delta L$ of the distance from the antenna 12 to the reflector 9A varies from 0 to a half wavelength, $\lambda/2$, the phase shift $\Delta\varphi$ varies continuously from 0 to $2\pi$. In other words, when the phase of the reflected wave before movement is $\varphi_0$, the phase of the reflected wave varies continuously from $\varphi_0$ to $\varphi_0+2\pi$.

Therefore, in a case where the cab 3 has moved the distance "d", and the change $\Delta L$ of the distance from the antenna 12 to the reflector 9A is $\lambda/2$ or less, the phase shift $\Delta\varphi$ varies continuously from 0 to $2\pi$ during the movement by the distance "d", and the movement distance $\Delta s$ is uniquely associated with the phase shift $\Delta\varphi$. Then, after the movement by the distance "d", that is, when $\Delta s=d$, $\Delta\varphi=2\pi$ holds. Therefore, since the phase of the reflected wave varies by $2\pi$ every time the cab 3 moves the distance of the interval "d", the movement distance of the cab 3 is given by the following mathematical expression (4), including the phase shift $\Delta\varphi$, and the interval "d" of the reflectors 9.

$$\Delta s=(\Delta\varphi/2\pi)\cdot d \quad (4)$$

Using the mathematical expression (4), the movement distance of the cab 3 can be calculated without using the angle of maximum reflection intensity. In addition, according to this method, the movement distance of the cab 3 can be calculated without using the distance from the antenna 12 to the reflective body 8. Therefore, according to this method, it is also possible to reduce an error due to misalignment of the antenna 12 mounted.

On the other hand, in a case where the cab 3 has moved the distance "d", and the change $\Delta L$ of the distance from the antenna 12 to the reflector 9A exceeds $\lambda/2$, the phase shift $\Delta\varphi$ reaches $2\pi$ during the movement by the distance "d". Therefore, the movement distance $\Delta s$ cannot be uniquely associated with the phase shift $\Delta\varphi$. As a result, the movement distance of the cab 3 may not be calculated correctly using the mathematical expression (4).

Note that, as described above, the angle of maximum reflection intensity of the reflected wave received by the receiving antenna 12b is not necessarily the angle $\theta_r$ (corresponding to a direction of the reflector 9A), and may be an angle corresponding to a nearer region. Considering this, preferably, the interval "d" is determined such that, when the cab 3 moves the distance "d", the change $\Delta L$ of the distance from the antenna 12 to the reflector 9 closest to the antenna 12, among the reflectors 9 included in the exposed area of the transmitted wave, is at most $\lambda/2$ or less. By determining the interval of the reflectors 9 in this manner, it is possible to more accurately calculate the movement distance of the cab 3.

As described above, the movement distance $\Delta s$ is calculated based on the phase shift $\Delta\varphi$, using the fact that the phase of the reflected wave received by the receiving antenna 12b varies continuously and periodically in accordance with the positional relationship between the antenna 12 and the reflectors 9. Thus, the reflectors 9 are arranged such that the exposed area of the transmitted wave always includes at least one reflector 9.

Now, we describe an operation of the movement-distance measuring apparatus 10 according to the first embodiment.

Figure 4:
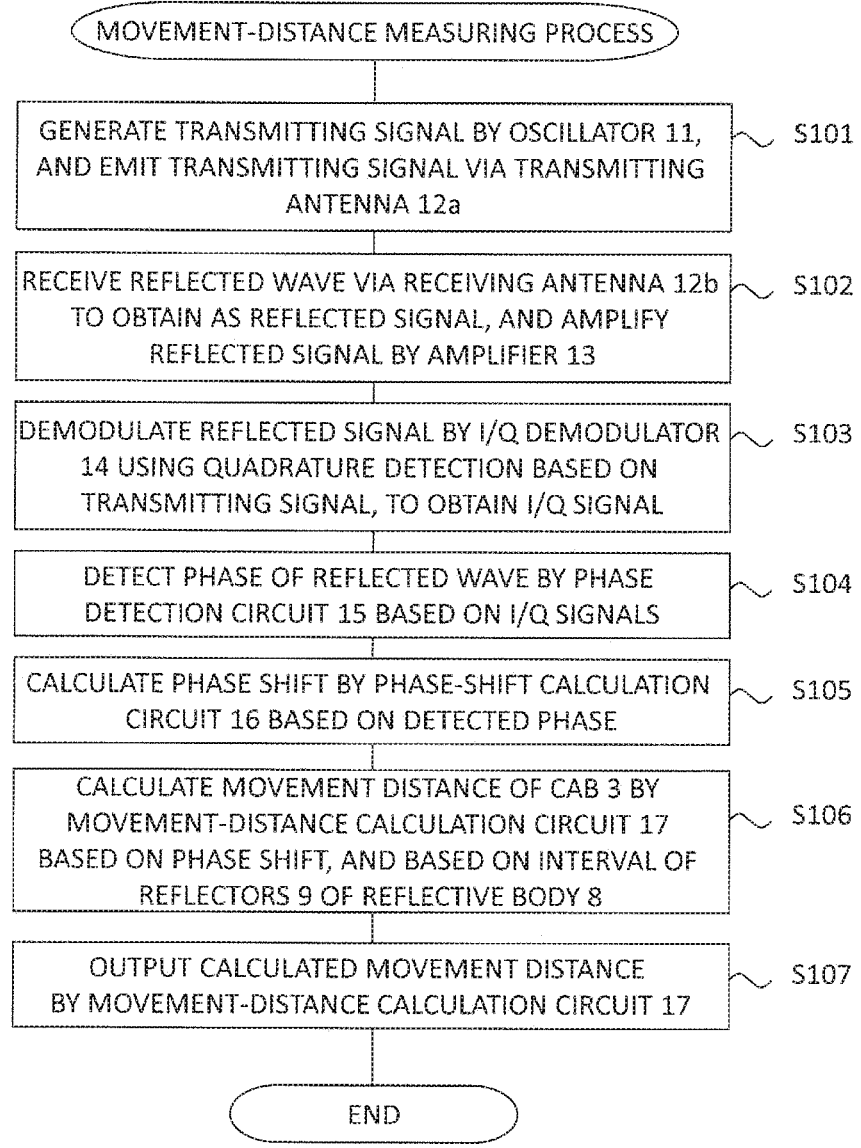
FIG. 4 is a flowchart showing a movement-distance measuring process executed by the movement-distance measuring apparatus 10 according to the first embodiment of the present invention.

FIG. 4 is a flowchart showing a movement-distance measuring process executed by the movement-distance measuring apparatus 10 according to the first embodiment of the present invention. The movement-distance measuring apparatus 10 executes the movement-distance measuring process at temporal intervals during which the cab 3 moves at a maximum speed by a distance sufficiently smaller than a wavelength of the transmitted wave (e.g., 1/10 or less thereof).

At first, in step S101, the oscillator 11 generates a transmitting signal having a preset frequency, and the transmitting antenna 12a emits the transmitting signal generated by the oscillator 11, as a radio wave, toward the reflective body 8. Next, in step S102, the receiving antenna 12b receives the radio wave emitted from the transmitting antenna 12a and reflected by the reflective body 8, and obtains the radio wave as a reflected signal, and the amplifier 13 amplifies the reflected signal to a certain amplitude level. Next, in step S103, the I/Q demodulator 14 demodulates the reflected signal passed from the amplifier 13, using quadrature detection (I/Q detection) based on the transmitting signal generated by the oscillator 11 as a reference signal, to obtain I/Q signals. Next, in step S104, the phase detection circuit 15 detects a phase of the reflected wave based on the I/Q signals obtained by the I/Q demodulator 14. Next, in step S105, the phase-shift calculation circuit 16 calculates a phase shift based on the phase detected by the phase detection circuit 15. Next, in step S106, the movement-distance calculation circuit 17 calculates a movement distance of the cab 3, based on the phase shift calculated by the phase-shift calculation circuit 16, and based on the interval of the reflectors 9 of the reflective body 8. Details of how to calculate the movement distance of the cab 3 are as described above. Next, in step S107, the movement-distance calculation circuit 17 outputs a signal indicating the calculated movement distance, to the output terminal 19.

According to the movement-distance measuring apparatus 10 of the first embodiment described above, since the movement distance is calculated based on the interval of the reflectors 9 of the reflective body 8, it is possible to more accurately measure the movement distance of the cab 3 as compared to the prior art, by reducing an error due to a change in angle of maximum reflection intensity according to movement, and reducing an error due to misalignment of the antenna 12 mounted.

In addition, according to the movement-distance measuring apparatus 10 of the first embodiment, since the interval of the reflectors 9 is determined based on a wavelength of a transmitted wave from the transmitting antenna 12a, in consideration of phase-shift characteristics of the reflected wave, it is possible to improve the accuracy of measuring the movement distance of the cab 3.

In addition, according to the movement-distance measuring apparatus 10 of the first embodiment, in the technical field of an elevator, it is possible to accurately measure a movement distance and a speed of the cab 3, using a radio wave, in a contactless manner. Thus, it is possible to remove a conventional governor, made of an encoder and a rope extending over the entire length of a hoistway, and therefore, it is possible to reduce installation costs and maintenance costs.

Second Embodiment

A second embodiment illustrates a case of further having a configuration for correcting the phase of the reflected wave detected by the phase detection circuit 15, and then, calculating the movement distance of the cab 3.

Figure 5:
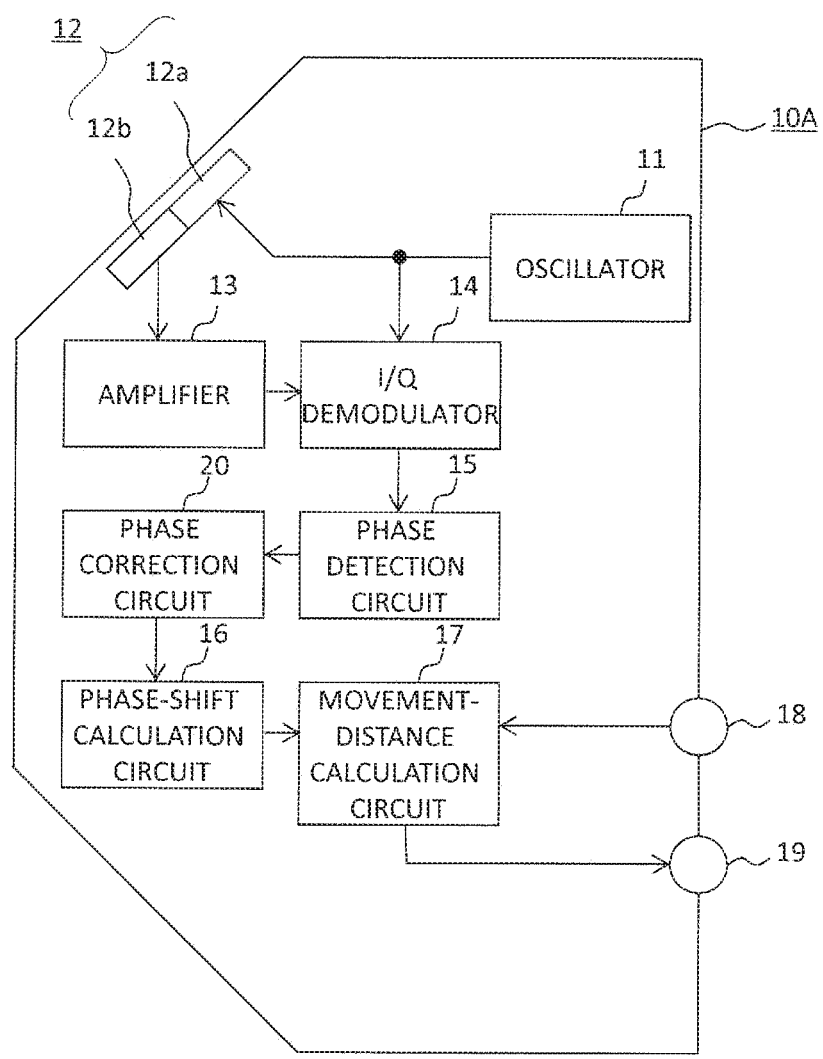
FIG. 5 is a diagram showing an internal configuration of a movement-distance measuring apparatus 10A according to a second embodiment of the present invention.

FIG. 5 is a diagram showing an internal configuration of a movement-distance measuring apparatus 10A according to the second embodiment of the present invention. The movement-distance measuring apparatus 10A of FIG. 5 is characterized by a phase correction circuit 20, in addition to the components of the movement-distance measuring apparatus 10 according to the first embodiment shown in FIG. 2.

The phase correction circuit 20 is phase correction means to correct a phase detected by the phase detection circuit 15, based on a value of the detected phase. The phase-shift calculation circuit 16 calculates the phase shift based on the phase corrected by the phase correction circuit 20, instead of based on the phase detected by the phase detection circuit 15.

Figure 6:
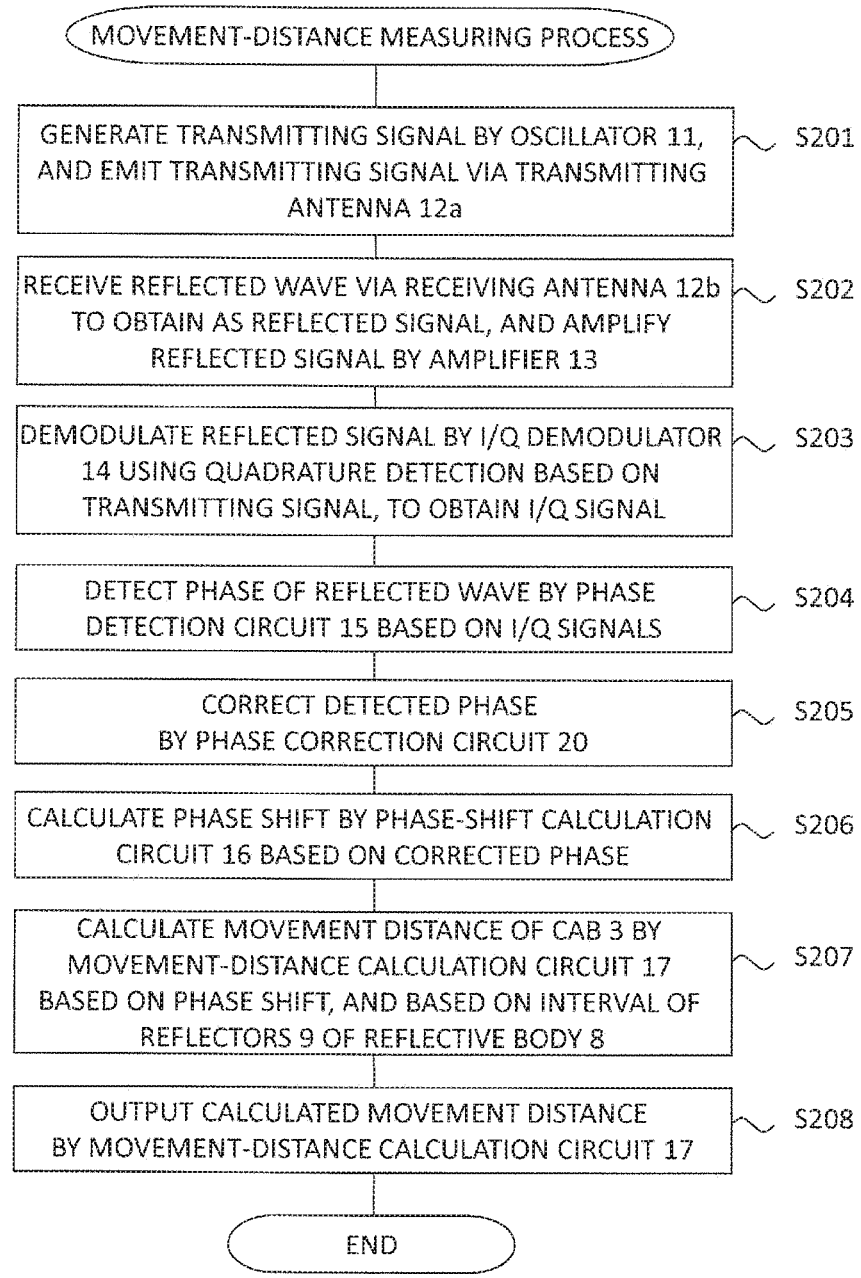
FIG. 6 is a flowchart showing a movement-distance measuring process executed by the movement-distance measuring apparatus 10A according to the second embodiment of the present invention.

FIG. 6 is a flowchart showing a movement-distance measuring process executed by the movement-distance measuring apparatus 10A according to the second embodiment of the present invention.

Referring to FIG. 6, since steps S201 to S204 are the same with steps S101 to S104 of the flowchart shown in FIG. 4, their descriptions are omitted here.

In step S205, the phase correction circuit 20 corrects a phase detected by the phase detection circuit 15, based on a value of the detected phase. Next, in step S206, the phase-shift calculation circuit 16 calculates a phase shift based on the phase corrected by the phase correction circuit 20.

Referring to FIG. 6, since steps S207 and S208 are the same with steps S106 and S107 of the flowchart shown in FIG. 4, their descriptions are omitted here.

Now, we describe how to correct the phase detected by the phase detection circuit 15.

As described above, when the cab 3 starts moving from a certain position, and has moved the distance of the interval "d" of the reflectors 9, the phase shift $\Delta\varphi$ of the reflected wave received by the receiving antenna 12b varies continuously from 0 to $2\pi$. However, the phase shift $\Delta\varphi$ does not necessarily vary linearly with respect to the movement distance. This is because the reflected wave received by the receiving antenna 12b is a composite wave of reflected waves from various points included in the exposed area of the transmitted wave. Therefore, in a case where the movement distance is not an integer multiple of the interval "d", an error may occur in the movement-distance calculated using the mathematical expression (4).

As described above, when the cab 3 has moved the distance "d", a positional relationship between the antenna 12 and the reflectors 9 is the same with their positional relationship before the movement, except being shifted by a distance of one reflector. Therefore, the phase shift of the reflected wave varies in the same manner during every movement by the distance "d". Hence, an error of the movement distance calculated by the above method also varies in the same manner during every movement by the distance "d". In other words, a predetermined error occurs in accordance with the phase (0 to $2\pi$) of the reflected wave.

Therefore, as an amount of correction corresponding to a detected phase, a periodically-varying amount of correction is predetermined so as to generate a phase varying linearly with respect to the movement distance of the cab 3. The phase correction circuit 20 calculates an amount of correction corresponding to the phase detected by the phase detection circuit 15, and corrects the detected phase with the amount of correction. The amount of correction may be a fixed value, or may be a value to be trained and updated. Note that, in this case, the phase is calculated such that when the phase has changed from 0 to $2\pi$, the phase returns from $2\pi$ to 0 and again changes to $2\pi$.

According to the movement-distance measuring apparatus 10A of the second embodiment described above, since the phase shift is calculated after correcting the phase of the reflected wave detected by the phase detection circuit 15, based on the value of the phase, it is possible to reduce an error occurring when the movement distance of the cab 3 is not an integer multiple of the interval of the reflectors 9, and therefore, it is possible to improve the accuracy of measuring the movement distance of the cab 3.

Third Embodiment

According to the second embodiment, we have described a case of correcting the phase of the reflected wave detected by the phase detection circuit 15, based on a value of the detected phase, and then, calculating the movement distance of the cab 3. On the other hand, according to a third embodiment, we describe a case of detecting a distance from the antenna 12 to the reflective body 8, and correcting the phase of the reflected wave with further reference to the detected distance.

As described in the second embodiment, when a predetermined error occurs in accordance with the phase (0 to $2\pi$) of the reflected wave, it is possible to uniquely determine an appropriate amount of correction for generating a phase varying linearly with respect to the movement distance of the cab 3, in accordance with the phase of the reflected wave. However, this relies on the assumption that the distance from the antenna 12 to the reflective body 8 is constant. If the distance from the antenna 12 to the reflective body 8 changes, then the error according to the phase of the reflected wave also changes, and accordingly, the appropriate amount of correction also changes.

In an elevator cab 3, a railway vehicle 31, and the like, the distance from the antenna 12 to the reflective body 8 may vary due to vibration occurring during traveling, or the like. Therefore, a movement-distance measuring apparatus 10B according to the third embodiment is configured to detect the distance from the antenna 12 to the reflective body 8, correct a phase of a reflected wave based on the detected distance and based on the phase of the reflected wave, and then, calculate a movement distance of the cab 3.

Figure 7:
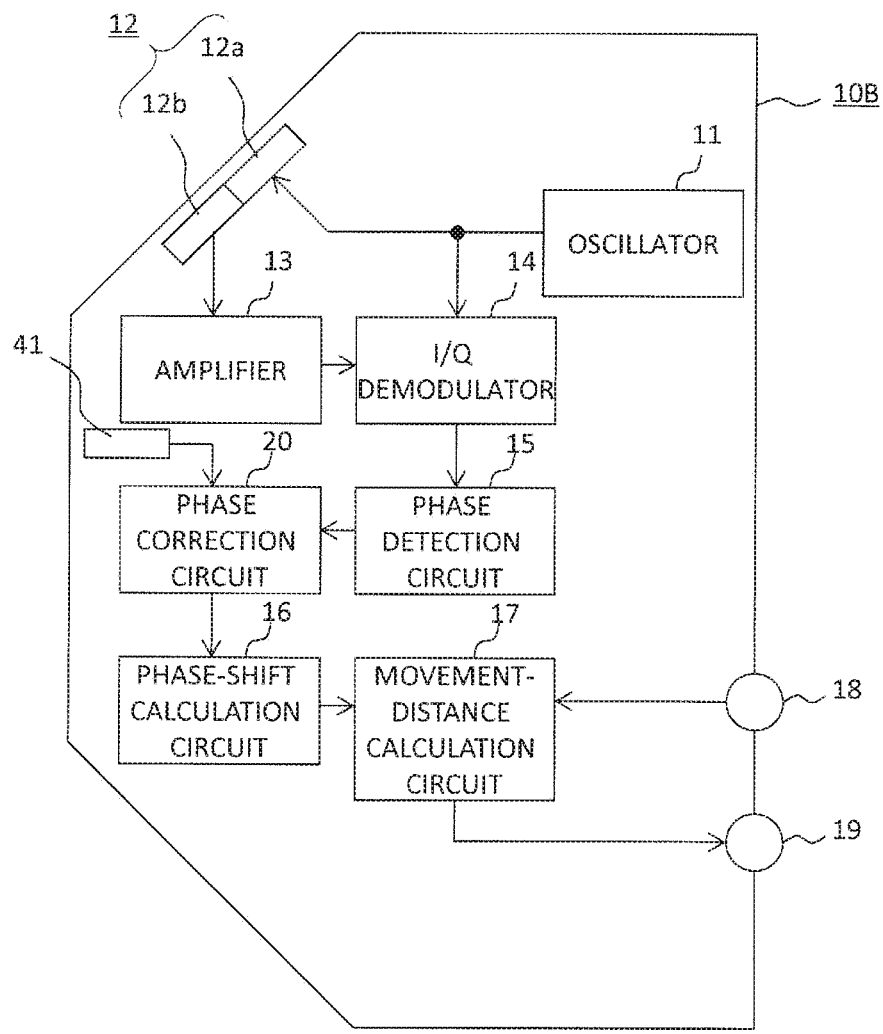
FIG. 7 is a diagram showing an internal configuration of a movement-distance measuring apparatus 10B according to a third embodiment of the present invention.

FIG. 7 is a diagram showing an internal configuration of the movement-distance measuring apparatus 10B according to the third embodiment of the present invention. The movement-distance measuring apparatus 10B of FIG. 7 is characterized by a distance detector 41, in addition to the components of the movement-distance measuring apparatus 10A according to the second embodiment shown in FIG. 5.

The distance detector 41 is distance detection means to detect a distance from the antenna 12 to the reflective body 8, and provided with, for example, a laser distance sensor, and the like. The phase correction circuit 20 corrects the phase detected by the phase detection circuit 15, based on a value of the detected phase, and based on the distance detected by the distance detector 41, so that the phase varies linearly with respect to the movement distance of the cab 3. In detail, the phase correction circuit 20 stores a correction table in an internal or external storage device, the correction table including various amounts of correction, each predetermined in accordance with a phase of the reflected wave, and in accordance with a distance from the antenna 12 to the reflective body 8. By referring to the correction table, the phase correction circuit 20 determines an amount of correction corresponding to the phase detected by the phase detection circuit 15, and corresponding to the distance detected by the distance detector 41, and corrects the detected phase with the determined amount of correction. Thus, it is possible to generate the phase so as to vary linearly with respect to the movement distance of the cab 3.

FIG. 8 is a view showing an example of the correction table used by the movement-distance measuring apparatus 10B according to the third embodiment of the present invention. The correction table includes various amounts of correction, each predetermined in accordance with a phase of the reflected wave, and in accordance with a distance from the antenna 12 to the reflective body 8. Each amount of correction in the correction table may be a fixed value, or may be a value to be trained and updated.

Note that the distance detector 41 may detect, instead of the distance from the antenna 12 to the reflective body 8, a distance uniquely associated with the distance from the antenna 12 to the reflective body 8, for example, a vertical distance from a surface of a housing of the movement-distance measuring apparatus 10B, to a surface of a guide rail 2 to which the reflective body 8 is mounted, or the like. In this case, the correction table includes various amounts of correction, each predetermined in accordance with a phase of the reflected wave, and in accordance with the vertical distance. By referring to such a correction table, the phase correction circuit 20 can determine an appropriate amount of correction so as to generate a phase varying linearly with respect to the movement distance of the cab 3, even when detecting a distance uniquely associated with the distance from the antenna 12 to the reflective body 8.

Figure 9:
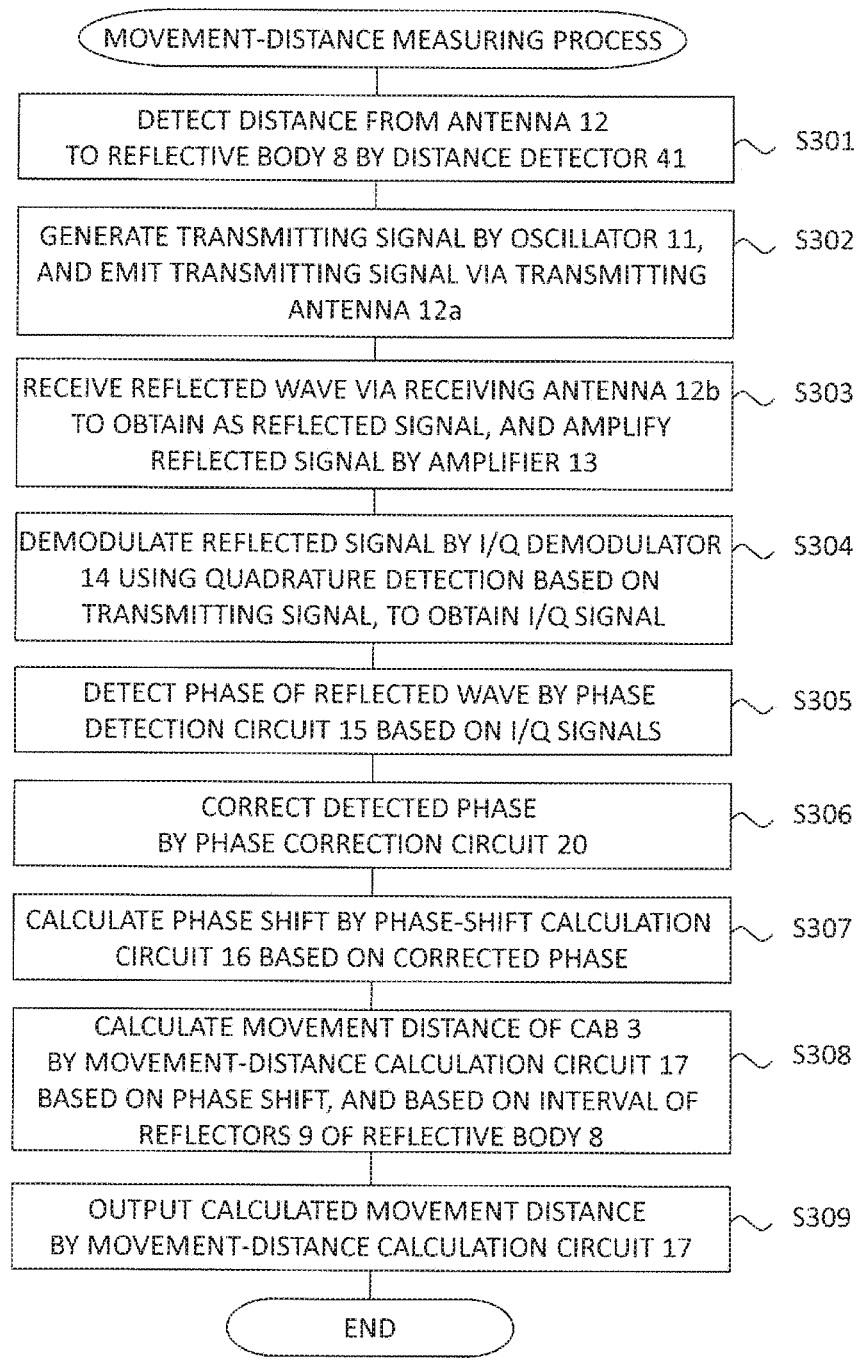
FIG. 9 is a flowchart showing a movement-distance measuring process executed by the movement-distance measuring apparatus 10B according to the third embodiment of the present invention.

FIG. 9 is a flowchart showing a movement-distance measuring process executed by the movement-distance measuring apparatus 10B according to the third embodiment of the present invention.

In step S301, the distance detector 41 detects a distance from the antenna 12 to the reflective body 8.

Since steps S302 to S305 are the same with S201 to S204 in the flowchart shown in FIG. 6, their descriptions are omitted here.

In step S306, the phase correction circuit 20 corrects a phase detected by the phase detection circuit 15, based on a value of the detected phase, and based on a distance detected by the distance detector 41.

Since steps S307 to S309 are the same with S206 to S208 in the flowchart shown in FIG. 6, their descriptions are omitted here.

According to the movement-distance measuring apparatus 10B of the third embodiment described above, the phase shift is calculated by detecting the distance from the antenna 12 to the reflective body 8, and correcting the phase detected by the phase detection circuit 15, based on the detected distance and the detected phase. Thus, it is possible to reduce an error occurring when the distance from the antenna 12 to the reflective body 8 varies due to vibration of the cab 3, or the like, and therefore, it is possible to improve the accuracy of measuring the movement distance of the cab 3.

Fourth Embodiment

A fourth embodiment illustrates a case where a movement-distance measuring apparatus is mounted to a railway vehicle. In this case, the railway vehicle is a moving object, and the movement-distance measuring apparatus measures a movement distance of the vehicle moving along a track.

Figure 10:
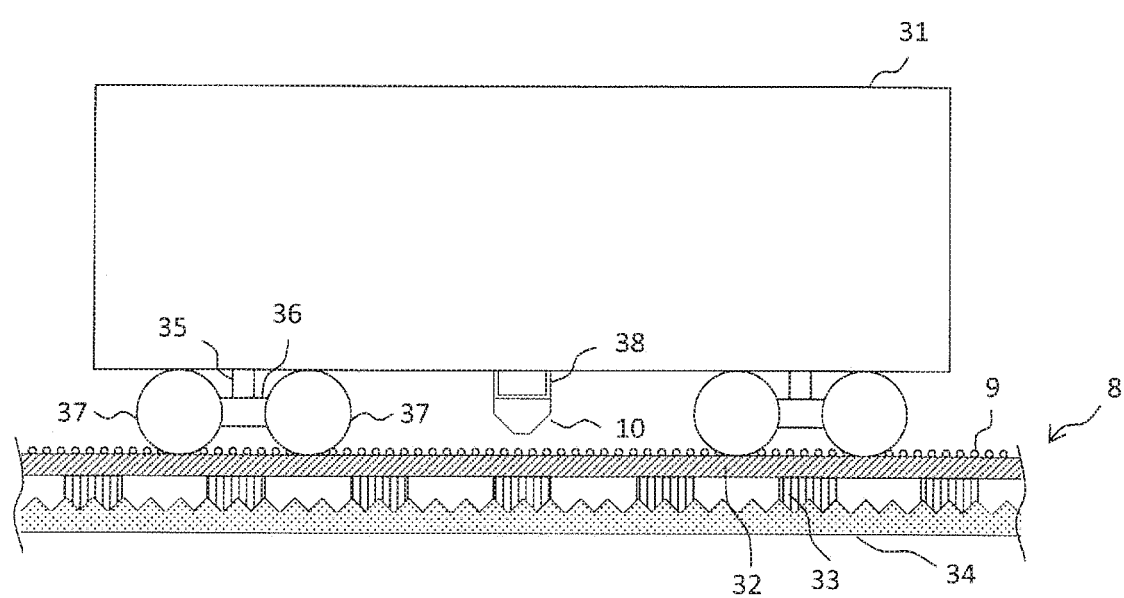
FIG. 10 is a view showing a configuration of a train to which a movement-distance measuring apparatus 10 according to a fourth embodiment of the present invention is mounted.

FIG. 10 is a view schematically showing a configuration of a train to which a movement-distance measuring apparatus 10 according to the fourth embodiment of the present invention is mounted. Referring to FIG. 10, in a track along which a vehicle 31 moves, rails 32 are laid, and thereunder, railroad ties 33 supporting the rails 32 are laid at certain intervals. In addition, ballast 34 is laid among the railroad ties 33. On the other hand, bogies 36 are coupled to the bottom surface of the vehicle 31 at front and rear regions thereof via connecting shafts 35, and wheels 37 are mounted to each of the bogies 36. In addition, the movement-distance measuring apparatus 10 is mounted on the bottom surface of the vehicle 31 at substantially center thereof via a support jig 38.

A reflective body 8, including a plurality of reflectors 9 arranged at constant intervals, is mounted to the rails 32. Meanwhile, it suffices that the reflective body 8 is installed along a moving path of the vehicle 31 so as to be substantially parallel to the moving direction of the vehicle 31. The reflective body 8 may be installed, for example, separately to the rails 32, or may be integrally formed with the rails 32.

Since an internal configuration of the movement-distance measuring apparatus 10 according to the fourth embodiment is similar to the internal configuration of the movement-distance measuring apparatus 10 according to the first embodiment shown in FIG. 2, their descriptions are omitted here.

Since a movement-distance measuring process executed by the movement-distance measuring apparatus 10 according to the fourth embodiment is similar to the flowchart shown in FIG. 4, their descriptions are omitted here.

According to the movement-distance measuring apparatus 10 of the fourth embodiment as described above, it is possible to achieve advantageous effects similar to those of the first embodiment.

In addition, according to the movement-distance measuring apparatus 10 of the fourth embodiment, in the technical field of a railway, it is possible to accurately measure a movement distance of the vehicle 31, using a radio wave, in a contactless manner. Thus, it is possible to reduce or completely remove the number of ground elements installed in order to correct a movement distance, and therefore, it is possible to reduce installation costs and maintenance costs.

The train according to the fourth embodiment may be provided with the movement-distance measuring apparatus 10A according to the second embodiment, or the movement-distance measuring apparatus 10B according to the third embodiment, instead of the movement-distance measuring apparatus 10 according to the first embodiment.

Moreover, the movement-distance measuring apparatus may be mounted not only to an elevator and a train, but also to a moving object traveling along a fixed surface, for example, an automobile.

A movement-distance measuring apparatus, a movement-distance measuring method, an elevator, and a vehicle according to aspects of the present invention are configured as follows.

According to a movement-distance measuring apparatus of a first aspect of the present invention, the movement-distance measuring apparatus is provided with: transmitting and receiving means, phase detection means, phase-shift calculation means, and movement-distance calculation means. The transmitting and receiving means transmits a radio wave toward reflective means including a plurality of reflectors arranged at constant intervals along a moving path of a moving object, and receives a reflected wave from the reflective means. The phase detection means detects a phase of the reflected wave received by the transmitting and receiving means. The phase-shift calculation means calculates a phase shift based on the phase detected by the phase detection means. The movement-distance calculation means calculates a movement distance of the moving object, based on the phase shift calculated by the phase-shift calculation means, and based on the interval of the reflectors.

Thus, since the movement distance is calculated based on intervals of the reflective body, it is possible to more accurately measure the movement distance of the moving object as compared to the prior art, by reducing an error due to a change in angle of maximum reflection intensity according to movement, and reducing an error due to misalignment of the antenna mounted.

According to a movement-distance measuring apparatus of a second aspect of the present invention, in the movement-distance measuring apparatus of the first aspect, the interval of the reflectors is determined based on a wavelength of a transmitted wave of the transmitting and receiving means.

Thus, since the interval of the reflectors is determined based on a wavelength of a transmitted wave from the transmitting and receiving means, in consideration of phase-shift characteristics of the reflected wave, it is possible to improve the accuracy of measuring the movement distance of the moving object.

According to a movement-distance measuring apparatus of a third aspect of the present invention, in the movement-distance measuring apparatus of the second aspect, the interval of the reflectors is determined such that, when the moving object moves a distance of the interval, a change in distance from the transmitting and receiving means to a reflector closest to the transmitting and receiving means, among one or more reflectors included in an exposed area of the transmitted wave, is equal to or less than a half wavelength of the transmitted wave.

Thus, since the interval of the reflectors is determined based on a wavelength of a transmitted wave from the transmitting and receiving means, in consideration of phase-shift characteristics of the reflected wave, it is possible to improve the accuracy of measuring the movement distance of the moving object.

According to a movement-distance measuring apparatus of a fourth aspect of the present invention, the movement-distance measuring apparatus of one of the first to third aspects is further provided with phase correction means that corrects the phase detected by the phase detection means, based on a value of the detected phase. The phase-shift calculation means calculates the phase shift based on the phase corrected by the phase correction means, instead of based on the phase detected by the phase detection means.

Thus, since a phase shift is calculated after correcting a phase of a reflected wave detected by phase detection means, based on a value of the detected phase, it is possible to reduce an error occurring when the movement distance is not an integer multiple of the interval of the reflectors, and therefore, it is possible to improve the accuracy of measuring the movement distance of the moving object.

According to a movement-distance measuring apparatus of a fifth aspect of the present invention, in the movement-distance measuring apparatus of the fourth aspect, the phase correction means corrects the phase detected by the phase detection means, with a periodically-varying amount of correction predetermined so as to generate a phase varying linearly with respect to the movement distance of the moving object.

Thus, since a phase shift is calculated after correcting a phase of a reflected wave detected by phase detection means, based on a value of the detected phase, it is possible to reduce an error occurring when the movement distance is not an integer multiple of the interval of the reflectors, and therefore, it is possible to improve the accuracy of measuring the movement distance of the moving object.

According to a movement-distance measuring apparatus of a sixth aspect of the present invention, the movement-distance measuring apparatus of the fifth aspect is further provided with distance detection means that detects a distance uniquely associated with a distance from the transmitting and receiving means to the reflective means. The phase correction means determines the amount of correction based on the phase detected by the phase detection means, and based on the distance detected by the distance detection means.

Thus, the phase shift is calculated by detecting the distance from the transmitting and receiving means to the reflective means, and correcting the phase detected by the phase detection means, based on the detected distance and the detected phase. Thus, it is possible to reduce an error occurring when a distance from the transmitting and receiving means to the reflective means varies due to vibration of the moving object, or the like, and therefore, it is possible to improve the accuracy of measuring a movement distance of the moving object.

According to an elevator of a seventh aspect of the present invention, the elevator is provided with the movement-distance measuring apparatus of one of the first to sixth aspects.

Thus, in the technical field of an elevator, it is possible to accurately measure a movement distance and a speed of a cab, using a radio wave, in a contactless manner. Thus, it is possible to remove a conventional governor, made of an encoder and a rope extending over the entire length of a hoistway, and therefore, it is possible to reduce installation costs and maintenance costs.

According to a vehicle of an eighth aspect of the present invention, the vehicle is provided with the movement-distance measuring apparatus of one of the first to sixth aspects.

Thus, in the field of a railway, it is possible to accurately measure a movement distance of the vehicle, using a radio wave, in a contactless manner. Thus, it is possible to reduce or completely remove the number of ground elements installed in order to correct a movement distance, and therefore, it is possible to reduce installation costs and maintenance costs.

According to a movement-distance measuring method of a ninth aspect of the present invention, the method includes the steps of: transmitting a radio wave toward a reflective body including a plurality of reflectors arranged at constant intervals along a moving path of a moving object, and receiving a reflected wave from the reflective body; detecting a phase of the reflected wave; calculating a phase shift based on a detected phase; and calculating a movement distance of the moving object based on a calculated phase shift and an interval of the reflectors.

Thus, since the movement distance is calculated based on intervals of the reflective body, it is possible to more accurately measure the movement distance of the moving object as compared to the prior art, by reducing an error due to a change in angle of maximum reflection intensity according to movement, and reducing an error due to misalignment of the antenna mounted.

REFERENCE SIGNS LIST

1: HOISTWAY
2: GUIDE RAIL
3: CAB
4: DRIVE APPARATUS
5: MAIN ROPE
6: COUNTERWEIGHT
7: SUPPORT JIG
8: REFLECTIVE BODY
9: REFLECTOR
10, 10A, 10B: MOVING-DISTANCE MEASURING APPARATUS
11: OSCILLATOR
12: ANTENNA
12a: TRANSMITTING ANTENNA
12b: RECEIVING ANTENNA
13: AMPLIFIER
14: I/Q DEMODULATOR
15: PHASE DETECTION CIRCUIT
16: PHASE-SHIFT CALCULATION CIRCUIT
17: MOVEMENT-DISTANCE CALCULATION CIRCUIT
18: INPUT TERMINAL
19: OUTPUT TERMINAL
20: PHASE CORRECTION CIRCUIT
31: VEHICLE
32: RAILS
33: RAILROAD TIE
34: BALLAST
35: CONNECTING SHAFT
36: BOGIE
37: WHEEL
38: SUPPORT JIG
41: DISTANCE DETECTOR

The invention claimed is:

1. A movement-distance measuring apparatus, comprising:
   a transmitting and receiving antenna that transmits a radio wave toward a reflective body including a plurality of reflectors arranged at constant intervals along a moving path of a moving object, and receives a reflected wave from the reflective body;
   a phase detection circuit that detects a phase of the reflected wave received by the transmitting and receiving antenna;
   a phase-shift calculation circuit that calculates a phase shift based on the phase detected by the phase detection circuit;
   a movement-distance calculation circuit that calculates a movement distance of the moving object, based on the phase shift calculated by the phase-shift calculation circuit, and based on the intervals of the reflectors; and
   a phase correction circuit that corrects the phase detected by the phase detection circuit, based on a value of the detected phase,
   wherein the phase-shift calculation circuit calculates the phase shift based on the phase corrected by the phase correction circuit, instead of based on the phase detected by the phase detection circuit, and
   wherein the phase correction circuit corrects the phase detected by the phase detection circuit with a periodically-varying amount of correction predetermined so as to generate a phase varying linearly with respect to the movement distance of the moving object.

2. The movement-distance measuring apparatus as claimed in claim 1, wherein the interval of the reflectors is determined based on a wavelength of a transmitted wave of the transmitting and receiving antenna.

3. The movement-distance measuring apparatus as claimed in claim 2, wherein the interval of the reflectors is determined such that, when the moving object moves a distance of the interval, a change in distance from the transmitting and receiving antenna to a reflector closest to the transmitting and receiving antenna, among one or more of the reflectors included in an exposed area of the transmitted wave, is equal to or less than a half wavelength of the transmitted wave.

4. The movement-distance measuring apparatus as claimed in claim 1, further comprising a distance detector that detects a distance uniquely associated with a distance from the transmitting and receiving antenna to the reflective body,
   wherein the phase correction circuit determines the amount of correction based on the phase detected by the phase detection circuit, and based on the distance detected by the distance detector.

5. An elevator comprising a movement-distance measuring apparatus, comprising:
   a transmitting and receiving antenna that transmits a radio wave toward a reflective body including a plurality of reflectors arranged at constant intervals along a moving path of a moving object, and receives a reflected wave from the reflective body;
   a phase detection circuit that detects a phase of the reflected wave received by the transmitting and receiving antenna;
   a phase-shift calculation circuit that calculates a phase shift based on the phase detected by the phase detection circuit;
   a movement-distance calculation circuit that calculates a movement distance of the moving object, based on the phase shift calculated by the phase-shift calculation circuit, and based on the intervals of the reflectors; and a phase correction circuit that corrects the phase detected by the phase detection circuit, based on a value of the detected phase, wherein the phase-shift calculation circuit calculates the phase shift based on the phase corrected by the phase correction circuit, instead of based on the phase detected by the phase detection circuit, and wherein the phase correction circuit corrects the phase detected by the phase detection circuit with a periodically-varying amount of correction predetermined so as to generate a phase varying linearly with respect to the movement distance of the moving object.

6. A vehicle comprising a movement-distance measuring apparatus, comprising:

a transmitting and receiving antenna that transmits a radio wave toward a reflective body including a plurality of reflectors arranged at constant intervals along a moving path of a moving object and receives a reflected wave from the reflective body;

a phase detection circuit that detects a phase of the reflected wave received by the transmitting and receiving antenna;

a phase-shift calculation circuit that calculates a phase shift based on the phase detected by the phase detection circuit;

a movement-distance calculation circuit that calculates a movement distance of the moving object based on the phase shift calculated by the phase-shift calculation circuit and based on the intervals of the reflectors; and a phase correction circuit that corrects the phase detected by the phase detection circuit, based on a value of the detected phase, wherein the phase-shift calculation circuit calculates the phase shift based on the phase corrected by the phase correction circuit, instead of based on the phase detected by the phase detection circuit, and wherein the phase correction circuit corrects the phase detected by the phase detection circuit with a periodically-varying amount of correction predetermined so as to generate a phase varying linearly with respect to the movement distance of the moving object.

7. A movement-distance measuring method, including the steps of transmitting a radio wave toward a reflective body including a plurality of reflectors arranged at constant intervals along a moving path of a moving object, and receiving a reflected wave from the reflective body;

detecting a phase of the reflected wave;

calculating a phase shift; and calculating a movement distance of the moving object based on a calculated phase shift and the intervals of the reflectors, correcting the detected phase based on a value of the detected phase, wherein said calculating the phase shift is based on the corrected phase instead of based on the detected phase, and wherein said correcting the detected phase is performed based on a periodically-varying amount of correction predetermined so as to generate a phase varying linearly with respect to the movement distance of the moving object.

\* \* \* \* \*